United States Patent [19]

Merrill et al.

[11] 4,398,012

[45] Aug. 9, 1983

[54] TRANSPARENT COPOLYAMIDE FROM CAPROLACTAM, CYCLIC DIAMINE AND CYCLIC DICARBOXYLIC ACID

[75] Inventors: Robert G. Merrill, Chester; Robert A. Lofquist; Gene C. Weedon, both of Richmond, all of Va.; John C. Haylock, Sparta, N.J.; Ian C. Twilley, Chester, Va.

[73] Assignee: Allied Corporation, Morris Township, Morris County, N.J.

[21] Appl. No.: 336,976

[22] Filed: Jan. 19, 1982

[51] Int. Cl.³ .............................................. C08G 69/14
[52] U.S. Cl. ..................................... 528/84; 528/323; 528/324; 528/325; 528/330; 528/331
[58] Field of Search ............... 528/324, 325, 331, 323, 528/330, 84

[56] References Cited

U.S. PATENT DOCUMENTS

| | | | |
|---|---|---|---|
| 2,868,769 | 1/1959 | Graham | 528/331 |
| 2,868,770 | 1/1959 | Temin | 528/331 |
| 2,985,626 | 5/1961 | Caldwell et al. | 528/324 |
| 2,985,628 | 5/1961 | Caldwell et al. | 528/324 |
| 3,206,439 | 9/1965 | Detoro et al. | 528/325 |
| 3,259,606 | 7/1966 | Okada | 528/324 |

OTHER PUBLICATIONS

English Language Translation of SHO 54-123 197, 9/79, Okada et al.

*Primary Examiner*—Harold D. Anderson
*Attorney, Agent, or Firm*—Richard A. Anderson

[57] ABSTRACT

This invention is a transparent alcohol resistant, hot water resistant, thermoplastically formable copolymer of (A) 80.4 to 88.8 weight percent epsilon-caprolactam and the remaining (B) 11.2 to 19.6 weight percent of substantially equimolar portions of a moiety derived from (1) a diamine or diisocyanate and (2) a diacid or (c) 11.2 to 19.6 weight percent para amino benzoic acid.

11 Claims, 1 Drawing Figure

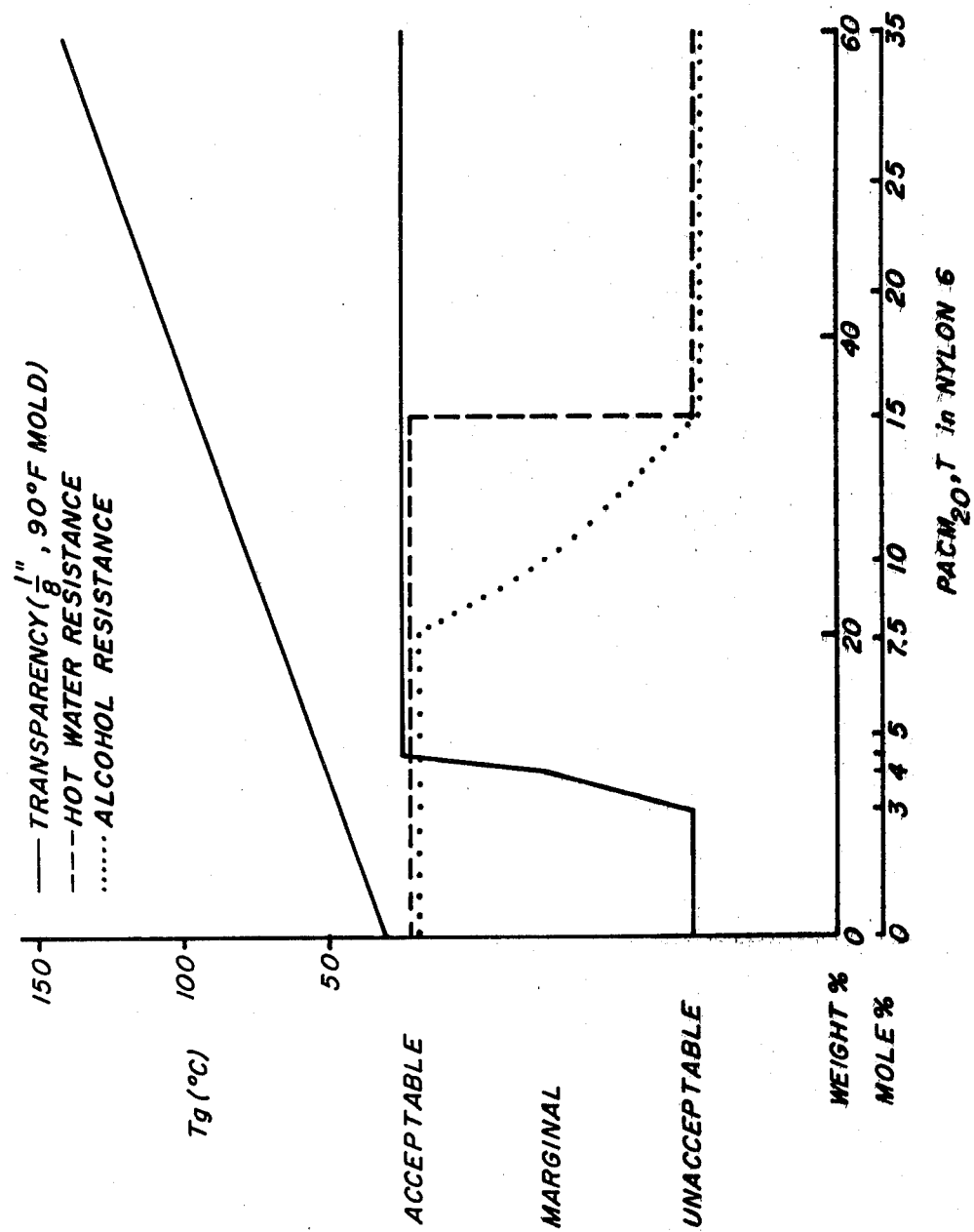

TRANSPARENT COPOLYAMIDE FROM CAPROLACTAM, CYCLIC DIAMINE AND CYCLIC DICARBOXYLIC ACID

BACKGROUND OF THE INVENTION

This invention relates to a thermoplastic copolyamide useful as a molding compound, more particularly it is a transparent, ethanol resistant, hot water resistant, thermoplastically formable copolymer of predominantly epsilon-caprolactam with small portions of a cyclic and/or aromatic amide as copolyamide.

In the following discussion of the compounds used to create the copolymers of this invention, all the patents listed below are hereby incorporated by reference, in toto.

The preferred diamine to be combined with a diacid, to form the aromatic and/or cyclic copolyamide, bis(4-aminocyclohexyl)methane, also known as PACM, is disclosed in U.S. Pat. No. 2,512,606 (column 4). The lower alkyl substituted PACM is disclosed in U.S. Pat. No. 2,516,585 (column 3). Also preferred are the diamines 1,3 or 1,4-cyclohexane bis(methylamine), known as BAMCH, disclosed in U.S. Pat. No. 3,012,994 (column 9 and in Example 10). The compounds 1,3 or 1,4-cyclohexane bis(ethylamine) or (propylamine) could be prepared by the same method. The compounds meta and para-xylene diamine, (MXDA or PXDA) are disclosed in U.S. Pat. No. 2,985,628. The diamine 1,4-diaminocyclohexane is disclosed in U.S. Pat. No. 3,794,625 (column 2). The BAMCH analog 2,2-bis-(amino cyclohexyl)propane and 2,2-bis(amino lower alkyl cyclohexyl)propane are disclosed in U.S. Pat. No. 3,840,501. The para,para'-methylene dianiline is disclosed in U.S. Pat. No. 4,065,441. The compounds meta and paraphenylenediamine also known as PDA are disclosed in U.S. Pat. No. 3,554,966. U.S. Pat. No. 3,794,625 also discloses 1,3 cyclohexane diamine while U.S. Pat. No. 4,207,411 discloses 1,4-cyclohexane diamine, terephthalic acid (TPA), and isophthalic acid (IPA). The compounds 2,5 and 2,6-bis(aminomethyl)-bicyclo-[2,1]heptane, also known as norbornanes, are disclosed in U.S. Pat. No. 3,876,585. The compounds, 2,4 and 2,6 metatoluene diamine, are disclosed in U.S. Pat. No. 4,072,665. The dicarboxylic acid of 1,4-cyclohexane dicarboxylic acid is also disclosed in U.S. Pat. No. 2,985,628. A series of naphthalene dicarboxylic acids are disclosed in U.S. Pat. Nos. 3,992,360, 4,012,365, and 3,554,971. Toluene diisocyanate is disclosed in U.S. Pat. No. 4,087,481 and methylene diphenyldiisocyanate is disclosed in U.S. Pat. No. 4,072,665. Paraaminobenzoic acid or PABA is readily available as a commercial product used for instance in suntan lotion. PABA can be copolymerized by the method of U.S. Pat. No. 3,673,143.

Various PACM and BAMCH copolymers with diacids such as TPA and IPA and other amides further copolymerized with epsilon-caprolactam are known in the art. PABA or aromatic diamines and diacids may be reacted according to the catalytic method as in U.S. Pat. No. 3,408,334, hereby incorporated by reference. The listing in Table I of prior art patents attempts to capsulize the state-of-the-art for the preferred PACM and BAMCH copolymers. All the patents listed below in Table I are also hereby incorporated by reference, in toto.

TABLE 1

| Patent Number | Copolymer Additive | Weight % of Nylon 6 |
|---|---|---|
| U.S. 3 847 877 | PACM-TPA | 30–65 |
| E. German 130 790 | PACM-TPA | 66–99 |
| Japan 49-1008 | PACM-TPA | 80–97 |
| Japan 54-123197 | PACM-TPA or IPA | 70–98 |
| U.S. 2 985 626 | BAMCH-TPA | about 30–62 |
| U.S. 4 071 506 | BAMCH-TPA | 5–60 |
| U.S. 3 012 994 | BAMCH-TPA or IPA | None |
| U.S. 3 942 360 | BAMCH-TPA or IPA + Aliphatic | less than 50 |
| U.S. 3 597 400 | PACM-TPA or IPA-HMDA* | none |
| Japan 054739 | BAMCH + Adipic Acid & HMDA + TPA | none |

| | Properties | | |
|---|---|---|---|
| Patent Number | Clear | Hot Water Resistance | Alcohol Resistance |
| U.S. 3 847 877 | Yes | Yes | Insoluble in methanol |
| E. German 130 790 | Yes | — | — |
| Japan 49-1008 | used in composite stretch fiber | | |
| Japan 54-123197 | Yes | Does not dissolve | Does not dissolve |
| U.S. 2 985 626 | Yes | — | — |
| U.S. 4 071 506 | Yes | — | — |
| U.S. 3 012 994 | — | — | — |
| U.S. 3 942 360 | Yes | — | — |
| U.S. 3 597 400 | Yes | No | Tested in methanol |
| Japan 054739 | Yes | — | — |

*Hexamethylenediamine

Applicants have discovered that for acceptable alcohol resistance, and for proper hot water resistance, combined with good transparency, there is a narrow and critical range of the weight percentage of epsilon-caprolactam, nylon 6, which can be present in the copolymer amide of this invention. See the figure showing the typical copolyamide of this invention, PACM-T in nylon 6 using PACM having a 20 percent trans, trans isomer content. Note that all the desired properties are only available in the copolyamide of this embodiment of this invention between 12.3 and 19.6 weight percent (4.5 to 7.5 mol %) of PACM-T and conversely between 80.4 and 87.7 weight percent of the nylon 6 copolyamide.

TEST PROCEDURES

I. Alcohol Resistance

1. The copolymer is molded into a rectangular piece 1.1 inches (0.028 m) long, 0.6 inch (0.015 m) wide and 1/16 inch (0.0016 m) thick, then quenched at 90° F. (32° C.). The molded piece above is bent back over itself 180° and mounted in that position in a machined alcohol resistant base with a channel in it.

2. The bent molded piece is immersed in 95% ethanol/water at room temperature for one week and then removed.

3. Stress cracking of the formerly immersed molded piece is observed. Any sign of crazing means the sample molded piece failed. Also, if the molded piece shows it had flowed or dissolved in any way, the sample molded piece failed. If no crazing is observed, the sample passes.

II. Hot Water Resistance

After the polymer is prepared into polymer pellets or chips, hot water washing is required at 100° C. to remove water extractables such as oligomers and unreacted monomer. (1) If the bulk of the chips fused to one another during this 60-minute water washing, and could not be broken apart, the sample failed. (2) If some chips fused, but could easily be broken apart, the sample was marginal. (3) If the bulk of the chips were not fused, the sample passed.

III. Transparency

The molded copolymer sample as in I above, except it is ⅛ inch (0.0032 m) thick, is visually inspected for transparency (not color). If it appears transparent to the naked eye, it passes. If there is some haze, the sample is marginal; and if translucent, it fails. Objects must be clearly seen through the sample.

IV. Glass Transition Temperature ($T_g$)

Glass transition temperatures were determined by differential scanning colorimetry using a heating rate of 20° C. per minute.

V. Deflection Temperature Under Load (DTUL)

Deflection temperatures under load were determined according to ASTM Method D648 (deflection temperature of plastics under flexural load).

SUMMARY OF THE INVENTION

This invention is a transparent, alcohol resistant, hot water resistant, thermoplastically formable copolymer of (A) 80.4 to 88.8 percent epsilon-caprolactam, and the remaining (B) 11.2 to 19.6 weight percent of substantially equimolar portions of a moiety derived from a (1) diamine or diisocyanate selected from the group consisting of:

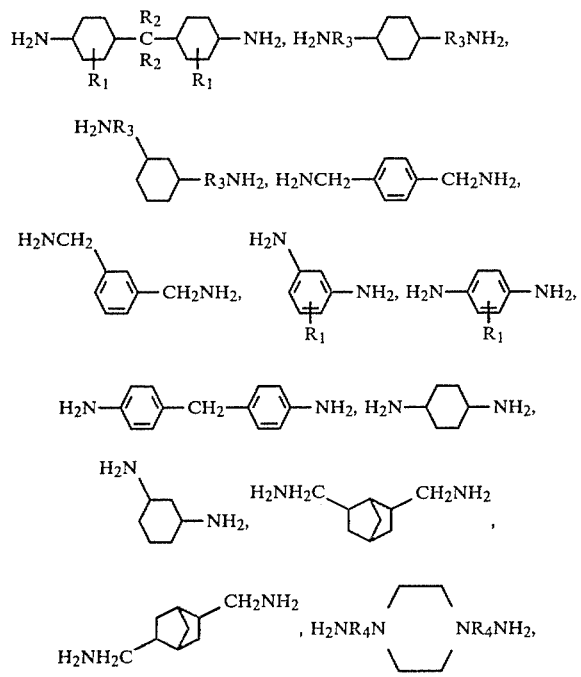

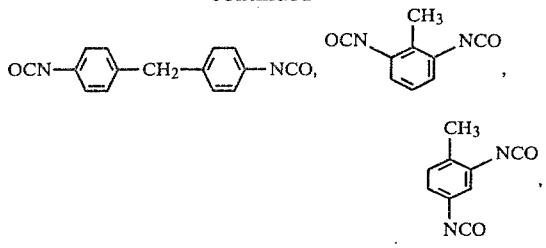

and mixtures thereof, and a diacid selected from the group consisting of

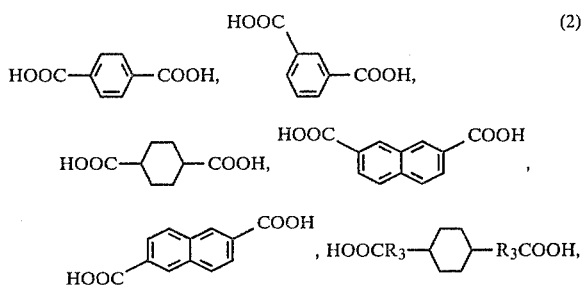 (2)

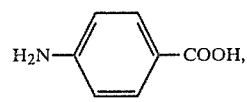

and mixtures thereof,
wherein
  $R_1$ is hydrogen, methyl, ethyl and/or propyl,
  $R_2$ is hydrogen, methyl and/or ethyl,
  $R_3$ is methyl and/or ethyl, and
  $R_4$ is methyl, ethyl or propyl,
or (C) 11.2 to 19.6 weight percent of $$H_2N-\bigcirc-COOH,$$

wherein the copolymer is thermoformable at a temperature greater than the glass transition temperature of the copolymer and will withstand exposure to an alcohol for extended periods without becoming translucent, dissolving or flowing.

The copolymer of this invention will withstand lower alcohols such as ethanol, methanol and isopropanol. Also, the copolymer of this invention will withstand a mixture of hydrocarbons and a lower alcohol such as gasohol where a mixture of gasoline 80 to 90% by weight and 1 to 20% by weight of ethanol. The preferred copolymer for use with gasohol is the copolymer containing bis(4-aminocyclohexyl)methane terephthalamide, which is also preferred for general use, along with 1,3-cyclohexane-bis(methyl) terephthalamide, and 1,4-cyclohexane-bis(methyl) terephthalamide.

The range of weight percent of nylon 6 in the copolyamide is critical to successful use of the copolymer in an actual commercial environment, such as a molded body for a fuel filter for use with gasohol in storage tanks, tractors, farm vehicles and equipment, construction vehicles and the like. See the figure illustrating the critical range for PACM-T. Somewhere below 80.4 percent nylon 6, alcohol (ethanol) resistance becomes marginal and at 75 weight percent some crazing occurs and the sample loses its physical integrity. In addition, at 65% and lower, hot water resistance was unacceptable. Somewhere above 87.7% by weight nylon 6, transparency was marginal, the copolymer begins to become translucent at 89% so that objects cannot be clearly seen through a molded sample, and at 91.3 percent transparency becomes unacceptable. The glass transition temperature ($T_g$) and heat distortion temperature of these samples are high enough for successful use in the environment described above. It can also be successfully used for injection molding of parts which may be in contact with alcohol and should also be transparent such as described above. The PACM-T copolymers of this invention in the following examples could be prepared according to the method given in U.S. Pat. No. 3,847,877 and the BAMCH-T copolymers could be prepared according to the method given in U.S. Pat. Nos. 2,985,626 or 3,012,994. It can clearly be seen from the data in Table II that in order to achieve all of the combined properties of good transparency, good hot water resistance and alcohol resistance, the narrow critical claimed range must be adhered to. Applicants have found that at the low percent content samples of the cyclic and/or aromatic copolyamide added, the isomer content of the cyclic and/or aromatic copolyamide is relatively unimportant to achieving the desirable characteristics.

DESCRIPTION OF THE PREFERRED EMBODIMENTS

Following are typical preparations of a $PACM_{20}$-T/6 copolymer of this invention. The subscript (e.g., 20) after PACM and other polymer name abbreviations herein indicates percent trans-trans isomer.

97.4 g of terephthalic acid is dissolved in 1379 g of molten epsilon-caprolactam (~80° C.) in a 3-liter agitated nitrogen purged vessel. To this solution 123.4 g of $PACM_{20}$ is added slowly with stirring thus forming in situ a suspension of the $PACM_{20}$-T salt in epsilon-caprolactam. The mixture becomes clear as the temperature is raised to 255° C. over 1 hour. The polymerization is continued at 255° C. with a nitrogen purge for 4 hours. The vessel is then pressurized and the resulting polymer is extruded into water as a strand and then cut into chips. The resulting chips are given five one-hour washes at 100° C. to remove unreacted epsilon-caprolactam and are dried at 100° C. with vacuum for 16 hours. Alternatively, PACM and terephthalic acid can be added to the epsilon-caprolactam in the form of a premade nylon salt.

Alternatively, the first portion of the reaction cycle, during which epsilon-caprolactam hydrolysis and polyaddition occurs can be carried out under pressure.

Alternatively, the polycondensation portion of the polymerization can be carried out under vacuum. The use of steam sweep can be employed to control the equilibrium molecular weight. Monofunctional and/or difunctional chain terminators may also be employed for molecular weight control.

Alternatively, high vacuum with high surface generation can be employed to simultaneously promote polycondensation and strip out the unreacted epsilon-caprolactam so that subsequent chip washing is unnecessary.

The method of addition and polymerization procedure is the same for BAMCH, only the weights change for different molecular weight (same mole basis). TPA and PACM are in substantially equal mol percents and the lactam added has an about 8-10 weight percent extra amount for unreacted monomer removal to get the desired 5% (mol) PACM-T copolymer.

The following table shows results of testing copolyamides prepared as described above. The percent copolymer is given first in mol percent then the weight percent is in parentheses.

TABLE II

| Copolymer | Transp. | Hot Water Resist. | Alcohol Resist. |
|---|---|---|---|
| $PACM_{20}$-T/6 | | | |
| 3 (8.7) | — | + | + |
| 4 (11.0) | o | + | + |
| 4.5 (12.3) | + | + | + |
| 5 (13.7) | + | + | + |
| 7.5 (19.6) | + | + | + |
| 10 (25.1) | + | + | o |
| 15 (34.7) | + | — | — |
| 20 (42.9) | + | — | — |
| 25 (50.0) | + | — | — |
| 30 (56.4) | — | — | — |
| 35 (60.1) | — | — | — |
| $PACM_{50}$-T/6 | | | |
| 5 (13.7) | + | + | + |
| $PACM_{70}$-T/6 | | | |
| 5 (13.7) | + | + | + |
| 1,4-$BAMCH_{50}$-T/6 | | | |
| 2.5 (5.8) | — | + | — |
| 5 (11.2) | + | + | + |
| 7.5 (16.3) | + | + | + |
| 10 (21.1) | + | + | o |
| 15 (29.8) | + | — | — |
| 20 (37.6) | o | — | — |
| 1,3-BAMCH-T/6 | | | |
| 5 (11.2) | + | + | + |
| MXDA-T/6 | | | |
| 5 (11.0) | o | + | — |

| Copolymer | Tg (°C.) | DTUL (°C.) 66 psi (4.55 × 10$^5$ Pa) | Methanol Resist. |
|---|---|---|---|
| $PACM_{20}$-T/6 | | | |
| 3 (8.7) | 52 | — | |
| 4 (11.0) | 55 | 55 | |
| 4.5 (12.3) | 56 | — | |
| 5 (13.7) | 57 | 62 | |
| 7.5 (19.6) | 70 | 67 | o |
| 10 (25.1) | 78 | 72 | o |
| 15 (34.7) | — | — | |
| 20 (42.9) | — | — | |
| 25 (50.0) | — | — | |
| 30 (56.4) | — | — | |
| 35 (60.1) | — | — | |
| $PACM_{50}$-T/6 | | | |
| 5 (13.7) | 58 | 62 | + |
| $PACM_{70}$-T/6 | | | |
| 5 (13.7) | 59 | 61 | + |
| 1,4-$BAMCH_{50}$-T/6 | | | |
| 2.5 (5.8) | 47 | — | |
| 5 (11.2) | 52 | 60 | |
| 7.5 (16.3) | 56 | — | o |
| 10 (21.1) | 62 | — | o |
| 15 (29.8) | — | — | |
| 20 (37.6) | — | — | |
| 1,3-BAMCH-T/6 | | | |
| 5 (11.2) | 52 | — | |
| MXDA-T/6 | | | |
| 5 (11.0) | 48 | — | |

+ acceptable
− unacceptable
o marginal
— no data available

Note that only those samples containing 80.4 to 88.8 weight percent nylon 6 which equals 11.2 to 19.6 weight percent of PACM, BAMCH or MXDA (meta xylene diamine) copolymer meet the criteria of combined acceptable transparency, alcohol resistance and hot water resistance. It is expected that a copolymer containing over 11.2 percent by weight of MXDA would be transparent. Those copolymers containing less than 11.2 weight percent or over 19.6 weight percent MXDA, PACM or BAMCH are comparative examples.

We claim:

1. A transparent, alcohol resistant, hot water resistant, thermoplastically formable copolymer of
   (A) 80.4 to 88.8 weight percent epsilon-caprolactam and the remaining
   (B) 11.2 to 19.6 weight percent of substantially equimolar portions of a moiety derived from a (1) diamine or diisocyanate selected from the group consisting of

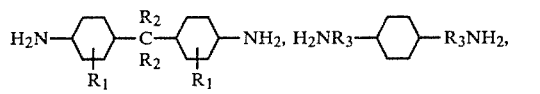

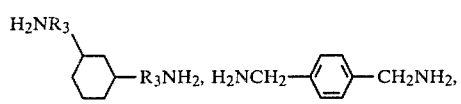

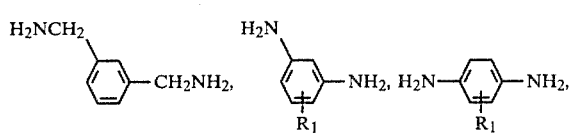

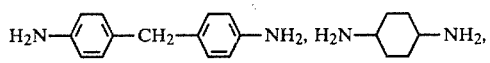

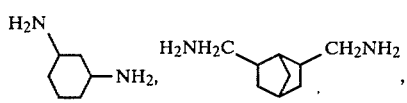

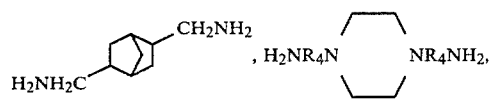

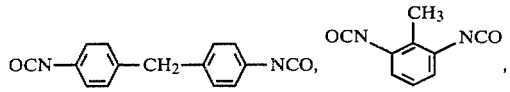

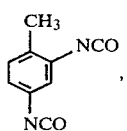

and mixtures thereof, and a diacid selected from the group consisting of

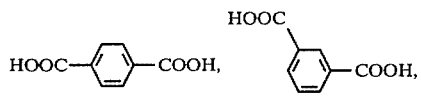

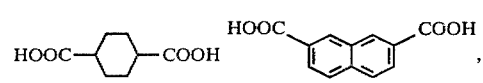

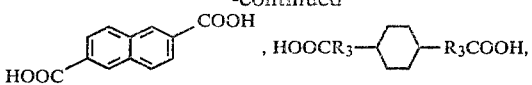

and mixtures thereof,
wherein $R_1$ is independently selected from the group consisting of —H, —$CH_3$, $CH_2CH_3$,

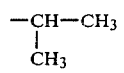

and —$CH_2CH_2CH_3$, $R_2$ is independently selected from the group consisting of —H, —$CH_3$ and —$CH_2CH_3$, $R_3$ is independently selected from the group consisting of —$CH_2$— and —$CH_2CH_2$—, and $R_4$ is independently selected from the group consisting of —$CH_2$—, —$CH_2CH_2$—, —$CH_2CH_2CH_2$— and

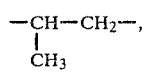

or (C) 11.2 to 19.6 weight percent of

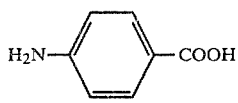

wherein said copolymer is thermoformable at a temperature greater than the glass transition temperature of the copolymer and withstands exposure to an alcohol for extended periods without becoming translucent, dissolving or flowing.

2. The copolymer of claim 1 wherein the copolymer withstands a lower alcohol.

3. The copolymer of claim 2 wherein the alcohol is ethanol.

4. The copolymer of claim 2 wherein the alcohol is methanol.

5. The copolymer of claim 2 wherein the alcohol is isopropanol.

6. The copolymer of claim 1 wherein the copolymer withstands a mixture of hydrocarbons and a lower alcohol.

7. The copolymer of claim 1 wherein the copolymer withstands a mixture of gasoline, 80–99 percent by weight and 1 to 20 percent by weight of ethanol.

8. The copolymer of claim 6 wherein (B)(1) is bis(4-aminocyclohexyl) methane and (B)(2) is terephthalic acid.

9. The copolymer of claim 1 wherein (B)(1) is bis(4-aminocyclohexyl) methane and (B) (2) is terephthalic acid.

10. The copolymer of claim 1 wherein (B)(1) is 1,3-cyclohexane bis(methylamine) and (B)(2) is terephthalic acid.

11. The copolymer of claim 1 wherein (B)(1) is 1,4-cyclohexane bis(methylamine) and (B)(2) is terephthalic acid.

* * * * *